United States Patent Office 3,816,487
Patented June 11, 1974

3,816,487
PROCESS FOR OBTAINING WOOL FAT BY WASHING RAW WOOL WITH REACTIVE SURFACE-ACTIVE AGENTS
Luzius Schibler, Riehen, Switzerland, assignor to Ciba-Geigy AG, Basel, Switzerland
No Drawing. Continuation-in-part of application Ser. No. 96,675, Dec. 9, 1970, which is a continuation-in-part of application Ser. No. 837,901, June 30, 1969, and a continuation-in-part of application Ser. No. 206,184, Dec. 8, 1971, which in turn is a continuation of application Ser. No. 38,507, May 18, 1970, all now abandoned. This application June 8, 1972, Ser. No. 260,876
Int. Cl. C11b 1/10
U.S. Cl. 260—412.8
14 Claims

ABSTRACT OF THE DISCLOSURE

A process for washing raw wool is provided which also comprises obtaining the wool fat contained therein as well as clarifying the wash water which results. The wool is first washed in an aqueous solution containing a reactive tenside; this tenside is then crosslinked and the wool fat together with the emulsified constituents are separated out from the clarified waste water. The wool fat is then extracted from the phase which has been separated off with an organic solvent.

CROSS REFERENCES

This application is a continuation-in-part of applicant's application Ser. No. 96,675, filed Dec. 9, 1970, which is a continuation-in-part of applicant's application Ser. No. 837,901, filed June 30, 1969, and of applicant's application Ser. No. 206,184, filed Dec. 8, 1971, which is a continuation of applicant's application Ser. No. 38,507, filed May 18, 1970, now all abandoned, the disclosures of which are relied on and incorporated by reference in this application.

The present invention relates to a process for washing raw wool and clarifying the wash liquid which comprises (a) washing the raw wool with an aqueous solution of a soluble, reactive surface active agent comprising an aminoplast precondensate which contains both hydrophobic and hydrophilic ether groups, said washing solution having a pH above 7.5,
(b) thereafter reducing the pH of the washing solution to crosslink the reactive surface active agent and form a water insoluble compositive resin and wool fat, and
(c) solvent extracting the composite to recover the wool fat therefrom.

A further object of the invention relates to washing raw wool and obtaining the wool fat contained therein as well as to the clarification of the wash waters which result, and is characterised in that (a) the raw wool is washed with an aqueous solution having a pH above 7.5 of a reactive surface-active agent,
(b) this reactive surface-active agent is crosslinked, after the washing process has taken place, by adding an acid,
(c) the wool fat together with the emulsified constituents are separated out by means of a flocculating agent and separated from the clarified waste water, and
(d) the wool fat is extracted from the phase which has been separated off by means of an organic solvent.

According to known processes, raw wool is preferably washed in aqueous liquors containing emulsifiers. The detergents used are either soap and sodium carbonate or synthetic wetting agents of the type of lauryl sulphate or non-ionic compounds such as for example addition products of ethylene oxide to alkylphenols. In all cases the dirt and the wool fat is thus emulsified by the washing liquors and in addition to the washed wool emulsions of wool fat are obtained, from which the latter can be obtained according to various methods. From the washing liquors containing synthetic detergents, the wool fat is separated out in yields of 40 to 50% by centrifuging, whilst the remainder is retained in the wash waters. If soap is used as the detergent, the wash waters containing soap are treated with sulphuric acid, whereupon the wool fat precipitates with the fatty acid of the soap (so-called acid process). The precipitate thus obtained is extracted with organic solvents, preferably benzine. In this extraction process, the wool fat is obtained with a considerable content of fatty acid. These fatty acids must again be removed from the crude wool fat by special processes.

It has now been found that the washing of raw wool can be performed in a particularly economic manner by means of so-called reactive surface-active agents. In doing so, not only is a wool fat free of extraneous fatty acids obtained in high yield, but the waste water is also largely clarified, this being a state of affairs of constantly increasing importance.

Reactive surface-active agents have already been described in a series of patent specifications (compare British Patent Specifications 1,022,215 and 1,120,305 and French Patent Specification 1,581,989). They are, in all cases, aminoplast derivatives, preferably urea-formaldehyde or melamine-formaldehyde compounds, which contain both hydrophobic and hydrophilic ether groups and are water-soluble and surface-active.

As reactive surface-active agents, water-soluble surface-active condensation products should for example be mentioned which contain radicals of monohydroxy compounds containing at least 4 carbon atoms, radicals of alcohols containing at least 2 hydroxyl groups and Me—O₃S-groups bonded to carbon atoms, wherein Me denotes an alkali metal.

The monohydroxy compounds preferably contain 4 to 18, especially 4 to 12 carbon atoms and e.g. are alkanols such as n-butanol, lauryl or stearyl alcohol or alkylaryl alcohols such as alkylphenols e.g. p-nonylphenol. The alcohols containing at least 2 hydroxyl groups preferably correspond to the formula (1) 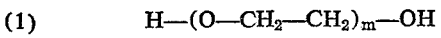H—(O—CH₂—CH₂)ₘ—OH where $m$ is a whole number from 1 to 25. Such alcohols e.g. are ethyleneglycol, diethyleneglycol and polyethyleneglycols.

Other reactive surface-active agents are water-soluble curable ethers of methylolmelamines or methylolureas, of which the methylol groups are etherified with monohydric alcohols possessing 4 to 22 carbon atoms or monohydric phenols and with polyethylene glycol.

The monohydric alcohols preferably are alkanols also with 4 to 18, especially 4 to 7 carbon atoms such as n-butanol, lauryl alcohol or stearyl alcohol or alkylphenols preferably containing 4 to 12 carbon atoms in the alkali radical such as p-nonylphenol. The polyethyleneglycols preferably have a molecular weight of 600 to 20,000 or more particularly of 1000 to 5000.

Other reactive tensides are water-soluble, surface active methylolmelamines or methylolureas whose methylol groups are at least partially etherified with an alcohol containing 4 to 22, especially 4 to 12 carbon atoms as e.g. specified before and an aliphatic hydroxycarboxylic acid having 2 to 4 carbon atoms, such as glycolic, 3-hydroxypropionic, 4-hydroxy-butyric, tartaric or lactic acid.

Particularly well-suited reactive surface-active agents are condensation products which are obtained by reaction of a methylolurea-n-butyl-ether with lauryl alcohol, ethylene glycol and sodium bisulphite or by reaction of an alkylphenol-modified methylolmelamine-methyl-ether with polyethylene glycol.

The reactive surface-active agents display the properties of a surface-active agent, that is to say of an emulsifier, dispersing agent, detergent or wetting agent, but are at the same time curable resin precondensates which on acid reaction and/or at higher temperatures change into insoluble and infusible products of crosslinking. The surface activity on the one hand, and the curability on the other, permit the reactive surface-active agents to solve a series of technically interesting tasks. Their manufacture and use for washing raw wool is described in the manufacturing instructions and examples which follow.

The acids used for curing the tensides may be organic or inorganic acids. The acids must be water-soluble and being able to lower the pH of the washing liquor below 5, perferably between 1 and 2. Preferred inorganic acids are e.g. ortho-phosphoric acid, hydrochloric acid, nitric acid and above all sulfuric acid. Preferred organic acids are lower aliphatic, carboxylic acids such as formic acid, acetic acid, oxalic acid or citric acid.

Preferably, washing is carried out in a washing liquor which as a pH-value of at least 7.5, preferably 8.0 and is at a temperature of between 50 to 70° C., for 5 to 15 minutes.

At pH-values below 8.0 the reactive surface-active agents in most cases already start to crosslink at the customary washing temperature of 60° C., so that the fatty substances and dirt substances which have been detached are reabsorbed on the wool. If the amount of sodium carbonate which is customary in most cases is added to the washing liquor, a pH-value of above 8.0 is maintained and the reabsorption of the dirt is reliably prevented. A clean and fat-free wool of good degree of whiteness is obtained.

The washing liquor, which in addition to the dirt contains the entire wool fat in an emulsified form, is now acidified by means of dilute sulphuric acid, in such a way that the pH preferably drops to about 2.0. The crosslinking of the reactive surface-active agent now takes place within a few hours in the washing liquor which is cooling. Since the reactive surface-active agent is not distributed in the solution in any desired manner but is concentrated at the surface of the droplets of dirt and fat, an at least partial encapsulation results on crosslinking, that is to say the particles are surrounded by a more or less dense capsule of crosslinked reactive surface-active agent. The suspensions produced in this manner can at times be rather stable. These suspensions are now destroyed by adding a flocculating agent, so that in a short time the crosslinked reactive surface-active agent separates out together with the wool fat, dirt and flocculating agent as a thick, sludgy layer and a clarified, dirt-free and foam-free waste water is left. The wool fat is obtained from the sludge layer by extraction with organic solvents, preferably aromatic or especially aliphatic, optionally chlorinated, hydrocarbons, such as benzene, toluene or xylene; halogenated aromatic hydrocarbons such as chlorobenzene or bromobenzene, acyclic aliphatic hydrocarbons such as octane or benzine, cyclic aliphatic hydrocarbons such as cyclohexane or tetrahydronaphthalene or halogenated aliphatic hydrocarbons such as trichloroethylene, tetrachloroethylene or dichloroethane, optional filtration and subsequent evaporation.

As flocculating agents, it is possible to use the known solid substances which display a high specific surface area, as are known as filtration agents and flocculating agents in industry, that is to say for example colloidal silica, kaolin, active charcoal, fuller's earth and filter earths, and asbestos. The amount of the additive depends on the amount of the reactive surface-active agent used and this in turn depends on the amount of the dirt and/or wool fat present. In general 0.5 to 1% of flocculating agent, relative to the weight of the washing liquor, will suffice.

In the manufacturing instructions and examples which follow, parts are understood as parts by weight and percentages as percentages by weight.

MANUFACTURING INSTRUCTIONS

A. 206 parts of aqueous formaldehyde of 36.5% strength are mixed with 230 parts of n-butanol and 8 parts of ammonia of 25% strength and, after heating to 40° C., with 60 parts of urea. The whole is heated to the boil and 37 parts of a mixture of methanol and water are distilled off. Then a mixture of 1 part of phosphoric acid of 85% strength in 20 parts of n-butanol is added, the whole is stirred for 15 minutes and a mixture of water and n-butanol is distilled off under vacuum, the former being separated and the latter returned to the reaction vessel. When 134 parts of water containing butanol have been removed, 87 parts of ethyleneglycol and 30 parts of lauryl alcohol are added and 218 parts of n-butanol, which entrains the last remnants of water, are distilled off under vacuum. The batch is condensed for 1 hour at 95 to 100° C. and then 15 parts of dry sodium bisulphite are added. After 30 minutes at 100° C. the reaction product has become readily soluble in water; it is stirred with 8 parts of triethanolamine and cooled, to yield 270 parts of a viscous, clear, resinous product which readily dissolves in water to form a strongly lathering solution.

B. 126 parts of melamine and 18 parts of ammonia of 25% strength are dissolved at 60° C. in 590 parts of 36.5% aqueous formaldehyde containing methanol, and at 80° C. 132 parts of a mixture of methanol and water are distilled out of this solution. Then 490 parts of n-butanol are added and the distillation under vacuum is continued, during which the mixture of water and butanol passing over is separated. The n-butanol flows back into the reaction vessel, and 118 parts of an aqueous layer separate. 3 Parts of formic acid of 85% strength dissolved in 5 parts of n-butanol and 73 parts of nonylphenol are added, and 452 parts of n-butanol are distilled off which entrains the last remnants of water. Then 770 parts of polyglycol ether (of molecular weight 1000) and 3 parts of glacial acetic acid are added, while distilling off under a continuous weak vacuum another 100 parts of n-butanol, and finally the whole is condensed for 30 minutes at 100° C. until the product readily dissolves in water to give a clear solution. 145 parts of triethanolamine are added, the whole is stirred and cooled, and yields 1420 parts of a soft, waxy product which readily dissolves in water to form a clear, lathering solution.

C. A mixture of 206 parts of aqueous formaldehyde of 36.5% strength, 170 parts of n-butanol and 60 parts of urea is mixed with 8 parts of ammonia of 25% strength and the whole is heated for 2 hours at 96° C. in a stirring flask equipped with a descending condenser, during which a total of 32 parts of an n-butanol+water mixture passes over. The batch is then cooled to about 50° C. and a solution of 1 part of phosphoric acid of 85% strength in 20 parts of n-butanol is added. The batch is then heated under vacuum to 80° C., during which water and n-butanol pass over. The water is separated from the distillate, while the n-butanol is returned to the reaction vessel. After 4 hours, the product is substantially anhydrous and can be mixed with benzene in any desired proportion. It is neutralized by adding 5 parts of triethanolamine and concentrated under vacuum to 212 parts.

150 parts of this so-called lacquer resin are mixed with 22 parts of lauryl alcohol, 100 parts of glycollic acid butyl ester and 3 parts of acetic acid of 100% strength. At 80 to 90° C. 68 parts of n-butanol are distilled off, the residue is stirred on for 30 minutes at 90° C. and 200 parts of ethanol and 25 parts of sodium hydroxide are added. The batch is hydrolyzed for 30 minutes at the boiling temperature of the alcohol and the solvents are then expelled under vacuum, to yield 166 parts of a solid, colourless substance which readily dissolves in water; its aqueous solution displays a slightly alkaline reaction and has a good wetting capacity.

D. 206 parts of 36.5% strength aqueous formaldehyde, 170 parts of n-butanol and 60 parts of urea are mixed with 8 parts of 25% strength ammonia and heated to 96° C. for 2 hours in a stirred flask with a descending condenser, in the course of which a total of 32 parts of n-butanol-water mixture distil off. The residue is now cooled to about 50° C. and 1 part of 85% strength phosphoric acid, dissolved in 20 parts of n-butanol, is added. The mixture is then heated to 80° C. in vacuo, whereupon water and n-butanol distil off. The water is separated out from the distillate, whilst the n-butanol runs back again into the reaction vessel. After 4 hours the product is practically water-free and is miscible with benzene in any ratio. It is now neutralised by adding 5 parts of triethanolamine and evaporated in vacuo to 212 parts, whereby the product subsequently described as lacquer resin D is obtained.

212 parts of the lacquer resin D are mixed with 62 parts of ethylene glycol and 33 parts of a mixture of fatty alcohol with 12 to 15 carbon atoms and an average molecular weight of 207, as well as 3 parts of glacial acetic acid, and the mixture is heated to 115–140° C. in a stirred flask with descending condenser, in the course of which 60 parts of n-butanol distil off. After cooling to 100° C. 15 parts of finely powdered sodium bisuphite are added and the mixture is stirred for a further 20 minutes at 100° C., until the reaction product easily dissolves in water to give a clear solution. 8 parts of triethanolamine are now added and the mixture is stirred and cooled. A stable, viscous reactive surface-active agent which is easily soluble in water to give foaming solutions is obtained.

E. 390 parts of hexamethylolmelamine-hexamethylether, 440 parts of nonylphenol and 1540 parts of polyethylene glycol ether of molecular weight 1540 are fused together and the homogeneous mixture is treated with 1.7 parts of 85% strength phosphoric acid. The whole is gradually heated to 130° C., in the course of which methanol distils off. As soon as the reaction product has become water-soluble, 7 parts of triethanolamine are added and the mixture is stirred and cooled. 2340 parts of a semi-solid colourless mass are obtained, which dissolves easily in water to give foaming solutions.

F. 150 parts of the lacquer resin D are mixed with 22 parts of lauryl alcohol, 100 parts of glycollic acid butyl ester and 3 parts of 100% strength acetic acid, 68 parts of n-butanol are distilled off at 80 to 90° C., the mixture is stirred for a further 30 minutes at 90° C. and 200 parts of ethanol and 25 parts of sodium hydroxide are then added. Saponification is carried out for 30 minutes at the boiling point of the alcohol and the solvent is then evaporated in vacuo. 166 parts of a solid, colourless, easily water-soluble substance are obtained. Its aqueous solution shows a slightly alkaline reaction and good wetting capacity.

Example 1

(a) 20 grams of raw wool is rinsed in cold water and then washed at 60° C. in 1 litre of soft water containing 2 g. of the reactive tenside A, while being pulled about in the bath for 10 minutes. Before the washing operation the washing liquor has a pH-value of 8.5 and after it a pH-value of 7.5. The washing liquor is squeezed out of the wool which is rinsed in warm water and then dried to obtain an unfelted product which displays a good white content. While still warm, the washing liquor is mixed with 20 ml. of sulphuric acid of 10% strength, whereby its pH-value is lowered to 1.6. The reactive detergent undergoes crosslinking and settles out after only 10 minutes in the form of an insoluble resin together with the wool fat and the impurities. The wool fat is extracted with 2× 50 ml of benzine of boiling range 100° to 140° C. The benzine solution, which is easy to separate, is filtered and evaporated, to yield 2.24 g. of a faintly yellowish wool fat having an acid number of 14.2. The remainder of the washing liquor forms an almost clear waste water.

(b) The above experiment is repeated but sodium-laurylsulphate is used in place of the reactive tenside. While the washing effect achieved is perfect, it is not possible to isolate the wool fat quantitatively from the washing liquor; 50 to 60% of it remain in the waste water even after centrifugation.

(c) The identical experiment is carried out but 5 g. of Marseilles soap instead of 2 g. of the reactive tenside A are used. The washing effect achieved is again perfect. On addition of 20 ml. of sulphuric acid of 10% strength to the washing liquor a mixture of fatty acid and wool fat separates and is extracted with 2× 100 ml. of benzine. The combined extracts are filtered and evaporated and yield 5.32 g. of a fat having an acid number of 89. The waste water is similar to that described under (a) above.

Example 2

(a) 20 grams of raw wool are rinsed in cold water and then washed in 1 litre of soft water containing 2.5 g. of the nonionic reactive tenside B described above, by being pulled about in the liquor for 6 minutes at 60° C. Before washing the washing liquor has a pH-value of 8.6 and after washing of 7.8. After the wool has been rinsed in warm water it is practically free from impurities. While still warm, the washing liquor is mixed with 20 ml. of sulphuric acid of 10% strength, whereby the reactive tenside is crosslinked within 30 minutes and settles out together with the wool fat as a floccular precipitate. The whole is extracted with 2× 50 ml. of benzine and the clarified waste water is removed. The benzine solution, which contains apart from the wool fat impurities, is filtered and evaporated, to leave as residue 1.18 g. of wool fat having an acid number of 12.2.

(b) The washing test described above is repeated except that an adduct of 10 mols of ethylene oxide with 1 mol of nonylphenol is used in place of the reactive tenside B. This washing leaves the wool clean, but it is not possible to isolate the wool fat quantitatively from the washing liquor in a simple manner. Accordingly, the waste water is very turbid and contains substantial quantities of emulsified wool fat.

Example 3

Raw wool is first rinsed in water and then washed for 10 minutes at 60° C. in a washing liquor containing per litre 1 g. of sodium carbonate as well as 2 g. of reactive tenside C. The goods-to-liquor ratio is 1:50 and the washing liquor has a pH-value of 10.7 before and of 9.6 after the washing operation. The wool thus treated is substantially free from fat. The washing liquor is cooled to room temperature and mixed with sulphuric acid (20 ml. of 10% sulphuric acid in 1 litre of water), whereby the pH-value is lowered to 2.0. After standing for 24 hours, the tenside together with the dirt and the wool fat has flocked out and can be separated quantitatively on the centrifuge. The resulting waste water is substantially clear. From the residue the wool fat is recovered by extraction.

Example 4

2 parts of raw wool are washed at 60 to 65° C. in 100 parts of a washing liquor which contains 0.2% of the reactive surface-active agent described in Manufacturing Instruction D and 0.1% of sodium carbonate. After rinsing, a fat-free and dirt-free wool of good degree of whiteness is obtained. 2 parts of 10% strength sulphuric acid are added to the wash liquor which is still warm, whereby its pH-value drops to 2.0. After the acidified wash liquor has stood for some hours and has cooled in the course thereof, 0.05 to 0.1 part of loose asbestos fibres are added to it and the whole is well stirred for 10 minutes. It is then left to stand for 12 hours. The crosslinked reactive surface-active agent, the dirt and the wool fat collect as a sludgy layer and can be easily separated from the fully clarified waste water by decantation, filtration or centrifuging. The wool fat is obtained quantitatively from the residue by extraction with 2 portions of 50 parts of benzine of boiling point 100 to 140° C. followed by filtration and evaporation.

A similar result is obtained if instead of asbestos fibres the same amount of precipitated silica and/or in place of the reactive surface-active agent A the surface-active agent described under C are used.

Example 5

2 parts of raw wool are washed in 100 parts of an aqueous solution which contains 2 parts of the reactive surface-active agent manufactured according to Instruction E as well as 1 part of $Na_2CO_3$, by pulling it through the solution for 10 minutes at 60 to 65° C. After rinsing in warm water, a fat-free and dirt-free wool of good degree of whiteness is obtained. The wash liquor which is still warm is acidified with such an amount of 1 N sulphuric acid that the pH drops to 2.0. After some hours 0.2% of fine asbestos fibres are added to the wash liquor and the whole is well stirred for 10 minutes and then left to stand undisturbed. After some hours a sludgy mass collects, which can be easily separated from the clarified water. The wool fat can be obtained quantitatively from the sludge layer by extraction with trichlorethylene. The waste water shows practically no further tendency to foaming even after neutralization to pH 7.0.

In place of the asbestos fibres, an equal amount of active charcoal can also be used.

I claim:

1. A process for washing raw wool and clarifying the wash liquid which comprises the steps of
   (a) washing the raw wool with an aqueous solution of a curable surface-active aminoplast derivative which contains both hydrophobic and hydrophilic ether groups, said washing solution having a pH above 7.5,
   (b) thereafter reducing the pH of the washing solution to a value below 5 to crosslink the curable surface-active aminoplast and form a water-insoluble compositive resin and wool fat mixture,
   (c) separating the wool fat and the water insoluble compositive resin from the washing liquor, and
   (d) extracting the wool fat from the wool fat-resin mixture by washing with an inert organic solvent for the wool fat.

2. The process of claim 1, wherein the surface-active aminoplast is a urea-formaldehyde or melamine-formaldehyde condensation product containing both hydrophobic and hydrophilic ether groups.

3. The process of claim 1, wherein the surface-active aminoplast is a methylol-melamine or methylolurea having methylol groups which are substituted by (a) ether radicals of monohydroxy compounds having 4 to 18 carbon atoms, (b) ether radicals of an alcohol of the formula

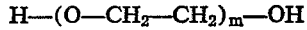

$$H—(O—CH_2—CH_2)_m—OH$$

in which $m$ is a whole number from 1 to 25 and (c) Me—$O_3S$-groups bound to carbon atoms, where Me is an alkali metal.

4. The process of claim 1, wherein the curable surface-active aminoplast is a methylol-melamine or methylolurea whose methylol groups are etherified with (a) monohydric alcohols containing 4 to 22 carbon atoms and with (b) polyethyleneglycol having a molecular weight of 600 to 20,000.

5. The process of claim 1, wherein the surface-active aminoplast is methylolmelamine or methylolurea whose methylol groups are etherified with (a) an alkanol containing 4 to 18 carbon atoms or an alkylphenol containing 4 to 12 carbon atoms in the alkyl part and with (b) polyethyleneglycol having a molecular weight of 600 to 20,000.

6. The process of claim 1, wherein the surface-active aminoplast is methylolmelamine or methylolurea whose methylol groups are etherified with (a) an alkanol containing 4 to 22 carbon atoms and (b) an aliphatic hydroxycarboxylic acid having 2 to 4 carbon atoms.

7. The process of claim 1, wherein the surface-active aminoplast is methylolurea whose methylol groups are etherified with n-butanol, lauryl alcohol, ethyleneglycol and which carries bound to carbon atoms sodium bisulfite radicals.

8. The process of claim 1, wherein the surface-active aminoplast is methylolmelamine whose methylol groups are etherified with n-butanol, nonylphenol and polyethyleneglycol having a molecular weight of 1,000.

9. The process of claim 1, wherein the surface-active aminoplast is methylolurea whose methylol groups are etherified with butanol, lauryl alcohol and glycollic acid.

10. The process of claim 1, wherein the wool fat together with the cross-linked derivatives of the surface-active aminoplast is separated out according to (c) by means of a solid, high-surface-area flocculating agent and separated from the clarified waste water.

11. The process of claim 1, wherein silica, kaolin, active charcoal, asbestos, fuller's earth or filter earth are used as flocculating agents.

12. The process of claim 1, wherein an inert aromatic, halogenated aromatic, acyclic aliphatic, cyclic aliphatic or halogenated aliphatic hydrocarbon is used as organic solvent according to (d).

13. The process of claim 12, wherein the organic solvent is an aliphatic hydrocarbon or a chlorinated aliphatic hydrocarbon.

14. The process of claim 1, wherein the washing is carried out at a temperature of between 50 and 70° C.

References Cited
UNITED STATES PATENTS

| | | | |
|---|---|---|---|
| 2,607,786 | 8/1952 | Derby | 260—412.8 |
| 2,723,281 | 11/1955 | Norman | 260—412.8 |
| 2,903,424 | 9/1959 | Fong | 8—139 X |

ELBERT L. ROBERTS, Primary Examiner